(12) United States Patent
Itkin et al.

(10) Patent No.: US 11,215,692 B2
(45) Date of Patent: Jan. 4, 2022

(54) FMCW RADAR WITH ADDITIONAL AM FOR INTERFERENCE DETECTION

(71) Applicant: Infineon Technologies AG, Neubiberg (DE)

(72) Inventors: Grigory Itkin, Munich (DE); Paul Meissner, Feldkirchen bei Graz (AT); Alexander Melzer, Neutillmitsch (AT)

(73) Assignee: Infineon Technologies AG, Neubiberg (DE)

( * ) Notice: Subject to any disclaimer, the term of this patent is extended or adjusted under 35 U.S.C. 154(b) by 352 days.

(21) Appl. No.: 16/356,385

(22) Filed: Mar. 18, 2019

(65) Prior Publication Data

US 2019/0293749 A1 Sep. 26, 2019

(30) Foreign Application Priority Data

Mar. 22, 2018 (DE) .......................... 102018106858.1

(51) Int. Cl.
| | | |
|---|---|---|
| *G01S 7/02* | (2006.01) | |
| *G01S 13/34* | (2006.01) | |
| *G01S 13/931* | (2020.01) | |
| *G01S 7/35* | (2006.01) | |
| *G01S 7/41* | (2006.01) | |

(52) U.S. Cl.
CPC .............. *G01S 7/023* (2013.01); *G01S 7/352* (2013.01); *G01S 7/414* (2013.01); *G01S 13/347* (2013.01); *G01S 13/931* (2013.01)

(58) Field of Classification Search
CPC .......... G01S 7/023; G01S 7/352; G01S 7/414; G01S 13/347; G01S 13/931
See application file for complete search history.

(56) References Cited

U.S. PATENT DOCUMENTS

| | | | | | |
|---|---|---|---|---|---|
| 5,832,022 | A | * | 11/1998 | Scott ..................... | H04L 27/201 375/142 |
| 6,097,331 | A | * | 8/2000 | Matsugatani ............. | G01S 7/35 342/109 |
| 10,048,353 | B2 | | 8/2018 | Vogt et al. | |
| 10,845,474 | B1 | * | 11/2020 | Riley ...................... | G01S 7/527 |
| 2016/0124075 | A1 | * | 5/2016 | Vogt ...................... | G01S 13/343 342/13 |
| 2018/0031675 | A1 | * | 2/2018 | Eshraghi ................ | G01S 7/4021 |
| 2018/0203095 | A1 | * | 7/2018 | Xie .......................... | G01S 7/023 |

FOREIGN PATENT DOCUMENTS

DE 102013210256 A1 4/2014

\* cited by examiner

*Primary Examiner* — Donald H B Braswell
(74) *Attorney, Agent, or Firm* — Harrity & Harrity, LLP

(57) ABSTRACT

A method for use in a radar device is described herein. In accordance some implementations, the method includes generating an RF oscillator signal which includes frequency-modulated chirps, amplitude-modulating the RF oscillator signal by a modulation signal, and transmitting the amplitude-modulated RF oscillator signal via at least one antenna. In some implementations, the method may further include receiving an RF signal that includes frequency-modulated chirp echo signals from a target object, down-converting the received RF signal into a base band using the RF oscillator signal for providing a base band signal, and processing the base band signal to detect information included in the modulation signal.

20 Claims, 8 Drawing Sheets

FMCW RADAR WITH ADDITIONAL AM FOR INTERFERENCE DETECTION

RELATED APPLICATION

This application claims priority under 35 U.S.C. § 119 to German Patent Application No. 102018106858.1, filed on Mar. 22, 2018, the contents of which are incorporated by reference herein in their entirety.

TECHNICAL FIELD

The present disclosure relates to the field of radar sensors, in particular to radar sensing techniques that allow interference detection and/or suppression.

BACKGROUND

Radar sensors can be found in numerous sensing applications in which distances and velocities of objects are to be measured. In the automotive sector, there is an increasing demand for radar sensors that may be used in so-called advanced driver-assistance systems (ADAS). Examples of an advanced driver assistive system are "adaptive cruise control" (ACC) and "radar cruise control" systems. Such systems may be used to automatically adjust the speed of an automobile so as to maintain a safe distance from other automobiles driving ahead. Other examples of advanced driver assistive system are blind-spot monitors, which may employ radar sensors to detect other vehicles in the blind spot of a vehicle. Particularly autonomous cars may use numerous sensors, such as radar sensors, to detect and locate various objects in their surroundings. Information about the position and velocity of objects in the area of an autonomous car is used to help navigate safely.

Modern radar systems make use of highly integrated radio frequency (RF) circuits which may incorporate all core functions of an RF front-end of a radar transceiver in one single package (single chip transceiver). Such RF front-ends usually include, inter alia, a local RF oscillator (LO), power amplifiers (PA), low-noise amplifiers (LNA), and mixers. Frequency-modulated continuous-wave (FMCW) radar systems use radar signals whose frequency is modulated by ramping the signal frequency up and down. Such radar signals are often referred to as "chirp signals" or simply as "chirps". In case of linear chirp signals the term "LFM signals" is sometimes used, wherein LFM stands for "linear frequency modulation". A radar sensor usually radiates sequences of chirps using one or more antennas, and the radiated signal is backscattered by one or more objects (referred to as radar targets) located in the "field of view" of a radar sensor. The backscattered signals (radar echoes) are received and processed by the radar sensor. The detection of the radar targets is usually accomplished using digital signal processing.

As more and more automobiles are being equipped with radar sensors, interference is becoming an issue. That is, the radar signal radiated by a first radar sensor (installed in one automobile) may intersperse to the reception antenna of a second radar sensor (installed in another automobile) and impair the operation of the second radar sensor.

SUMMARY

A method for use in a radar device is described herein. In accordance with some implementations, the method includes generating an RF oscillator signal which includes frequency-modulated chirps, amplitude-modulating the RF oscillator signal by a modulation signal, and transmitting the amplitude-modulated RF oscillator signal via at least one antenna. In some implementations, the method may further include receiving an RF signal that includes frequency-modulated chirp echo signals from a target object, down-converting the received RF signal into a base band using the RF oscillator signal for providing a base band signal, and processing the base band signal to detect information included in the modulation signal.

Furthermore, a radar device is described herein. In accordance with some implementations, the radar device includes an RF oscillator configured to generate an RF oscillator signal that includes frequency-modulated chirps, a modulator receiving the RF oscillator signal and a modulation signal and configured to amplitude-modulate the RF oscillator signal by the modulation signal. The radar device further includes one or more antennas configured to transmit the amplitude-modulated the RF oscillator signal and to receive an RF signal that includes frequency-modulated chirp echo signals from a target object, a mixer receiving the RF oscillator signal and the received RF signal and configured to down-convert the RF signal into a base band for providing a respective base band signal, and an analog-to digital converter configured to digitize the base band signal. A computing unit is configured to process the base band signal to detect information included in the modulation signal.

BRIEF DESCRIPTION OF THE DRAWINGS

The description can be better understood with reference to the following drawings and descriptions. The components in the figures are not necessarily to scale; instead emphasis is placed upon illustrating the principles of the description. In the figures, like reference numerals designate corresponding parts. In the drawings.

DETAILED DESCRIPTION

Figure 1:
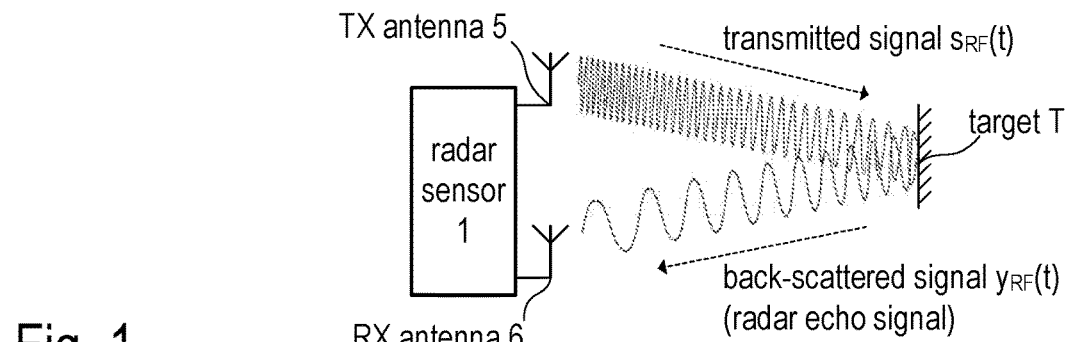
FIG. 1 is a sketch illustrating the operating principle of an FMCW radar system for distance and/or velocity measurement.

FIG. 1 illustrates a frequency-modulated continuous-wave (FMCW) radar sensor 1. In the present example, separate transmission (TX) and reception (RX) antennas 5 and 6, respectively, are used (bistatic or pseudo-monostatic radar configuration). However, it is noted that a single antenna can be used, so that the reception antenna and the transmission antenna will be physically the same (monostatic radar configuration). The transmission antenna 5 (quasi-) continuously radiates an RF signal $s_{RF}(t)$, which is frequency-modulated, for example, by a saw-tooth-shaped signal. When the radiated signal $s_{RF}(t)$ is back-scattered at an object T, which may be located in the radar channel within the measurement range of the radar device, the back-scattered signal $y_{RF}(t)$ is received by the reception antenna 6. The object T is usually referred to as "radar target". In a more general example, more than one target may be in the field of view of a radar sensor, and an antenna array may be used instead of a single RX antenna. Similarly, an antenna array may be used instead of a single TX antenna. Using multiple RX and TX antennas in a multi-channel radar system allows for the measurement of the angle of incidence of a radar echo, usually referred to as direction of arrival (DoA). Measurement of the direction of arrival is important for many applications, and thus most radar sensors will make use of antenna arrays. To keep the drawings simple, only one TX antenna and one RX antenna are shown in the figures. It is understood that the concepts described herein are readily applicable to radar sensors with antenna arrays.

Figure 2:
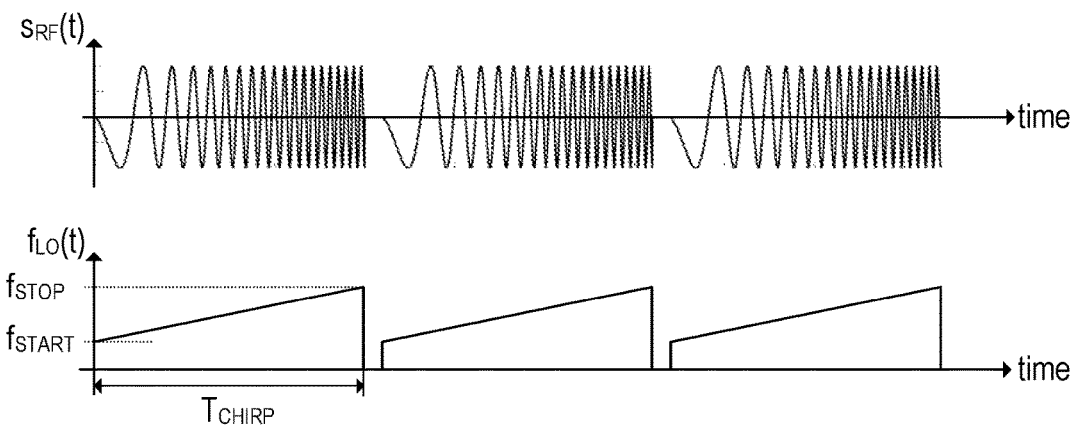
FIG. 2 includes two timing diagrams illustrating the frequency modulation of the RF signal used in FMCW radar systems.

FIG. 2 illustrates the mentioned frequency-modulation of the signal $s_{RF}(t)$. As shown in the top diagram of FIG. 2, the signal $s_{RF}(t)$ is composed of a series of "chirps", i.e. sinusoidal waveforms with increasing (up-chirp) or decreasing (down-chirp) frequency. In the present example, the instantaneous frequency $f_{LO}(t)$ of a chirp increases linearly from a start frequency $f_{START}$ to a stop frequency $f_{STOP}$ within a defined time span $T_{CHIRP}$ (see bottom diagram of FIG. 2). Such a chirp is also referred to as a linear frequency ramp. A linear frequency-modulated (LFM) signal with three identical linear frequency ramps is illustrated in FIG. 2. It is noted, however, that the parameters $f_{START}$, $f_{STOP}$, $T_{CHIRP}$ as well as the pause between the individual frequency ramps may vary dependent on the actual implementation of the radar device 1 and may also vary during operation of the radar device. In practice the frequency variation may be, for example, linear (linear chirp, frequency ramp), exponential (exponential chirp) or hyperbolic (hyperbolic chirp).

Figure 3:
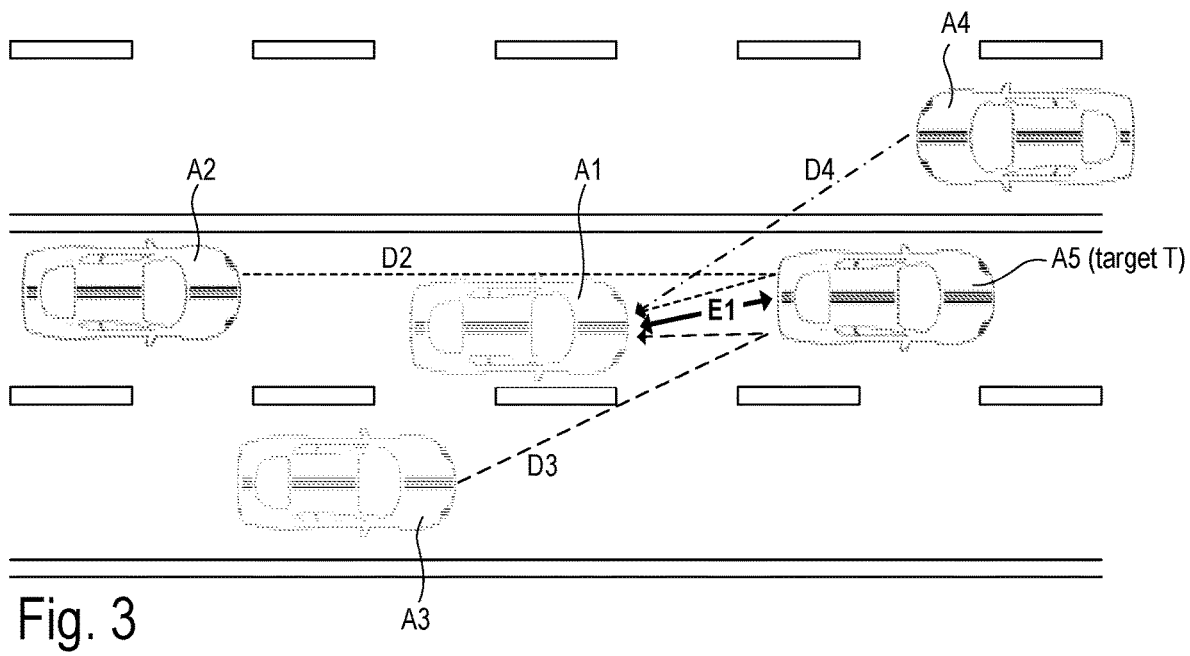
FIG. 3 illustrates one example of how interference is interspersed to the receiver of a radar sensor.

FIG. 3 illustrates one simple example showing how interferes can disturb the operation of a radar sensor. Accordingly, FIG. 3 illustrates a road with three lanes and five vehicles A1, A2, A3, A4, and A5. In the present example, vehicle A1 is considered as "own vehicle" and its radar sensor as "own radar sensor". The own radar sensor transmits a signal and senses an echo signal E1 back-scattered from vehicle A5, which is the radar target T to be detected by the own radar sensor. However, in addition to the desired echo signal E1, the own radar sensor receives disturbing signals D2, D3, D4 transmitted by the on-board radar sensors of vehicles A2, A3 and A4. These disturbing signals interfere with the desired radar echo E1 and may negatively affect the detection of radar targets from the received radar signal (including echo E1 as well as disturbing signals D2, D3, and D4).

Figure 4:
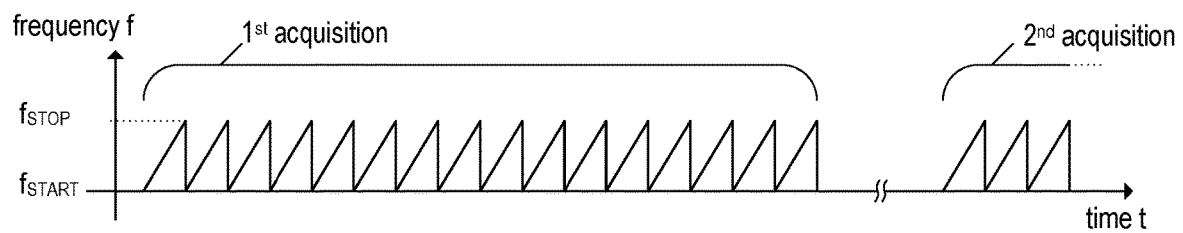
FIG. 4 is a timing diagram illustrating a sequence of chirps used for data acquisition in a radar sensor.

FIG. 4 schematically illustrates an LFM signal with an example FM scheme as is commonly implemented in FMCW radar sensors. In the depicted example, a sequence of sixteen up-chirps is transmitted for one data acquisition. It is noted that, in practice, a chirp sequence usually includes many more chirps (e.g. 256 chirps) and the present example has been simplified for illustration purposes only. A radar sensor transmits an LFM signal such as depicted in FIG. 4 and receives a respective radar echo signal. One example signal processing method for evaluating the radar echoes will be discussed later with reference to FIG. 12.

Figure 5:
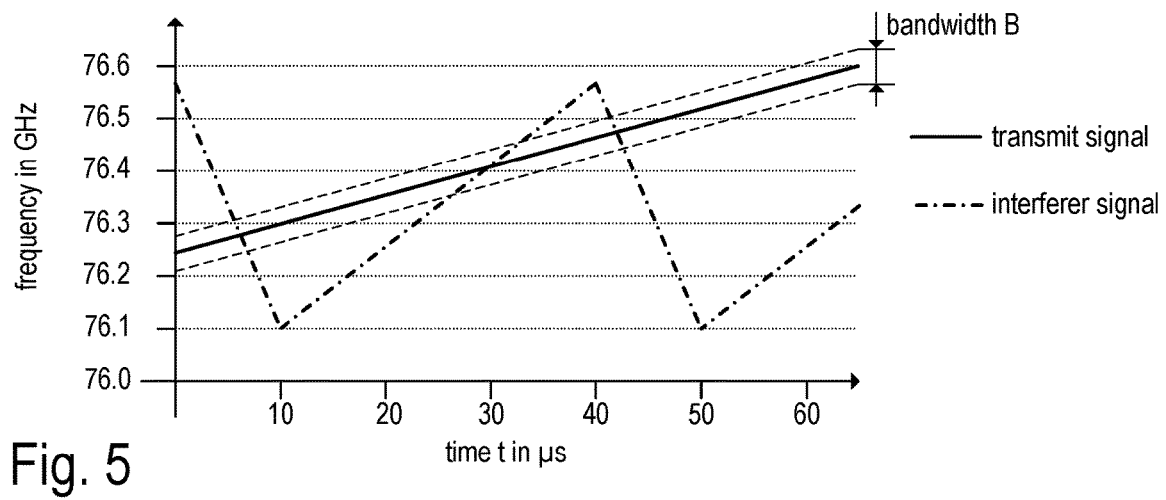
FIG. 5 illustrates in a timing diagram a transmit signal of a radar sensor and an interference signal from an interferer, wherein frequency-over-time waveform of these signals at least partially overlap.
Figure 6:
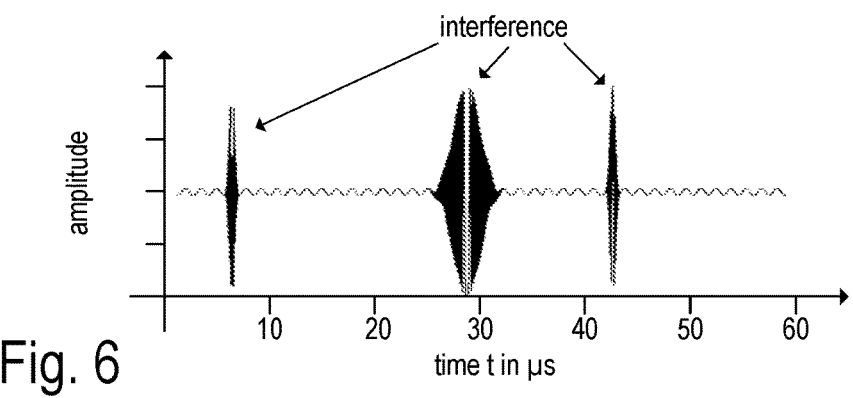
FIG. 6 illustrates one example waveform including a radar signal (after down-conversion to the base band) including a radar echo from a target and interference shown in FIG. 5.

Dependent on the characteristics of the interfering signals (cf. FIG. 3, signals D2, D3, and D4), the desired radar echoes may be affected in different ways. FIGS. 5 and 6 illustrate, by way of example, how an interferer may disturb the received radar echoes, when the interfering signals include chirps that have different parameters, particularly a different frequency slope than the radar echoes. FIG. 6 illustrates frequency over time of one chirp (chirp duration 60 µs) radiated by the own radar sensor in the example of FIG. 3. The start frequency of the radiates signal $s_{RF}(t)$ is approximately 76250 MHz and the stop frequency is approximately 76600 MHz. An interference signal (e.g. disturbing signal D3 in the example of FIG. 3) generated from another radar sensor includes an up-chirp starting at approximately 76100 MHz and stopping at 76580 MHz (chirp duration 30 µs) and a subsequent down-chirp starting at the stop frequency of the preceding up-chirp (76580 MHz) and stopping at the start frequency of the next up-chirp (76100 MHz) with a chirp duration of 10 µs. The bandwidth B of the base band signal of the own radar sensor is indicated in FIG. 5 by the dashed lines. FIG. 6 illustrates an example waveform of the (pre-processed) base band signal resulting from the received radar signal including a desired radar echo and interference. One can see that the signal components due to the interference have a significant magnitude in those time intervals, in which the frequency of the interference signal is within the bandwidth B of the radar sensor (see FIG. 5). In the present example, the interference occurs three times during the 60 µs chirp duration, namely at approximately 7 µs, 28 µs and 42 µs. As mentioned, the power of interference signals is usually higher than the power of radar echoes from real targets. Nevertheless, interference appears as comparably short bursts, whose duration depends on for how long the bandwidths of the signals overlap. Therefore, usually not all chirps of one acquisition sequence (see FIG. 4) are affected by interference. Further, interference signals and the transmit signal of a specific radar sensor are, in the present example, uncorrelated and thus the interference can be regarded as noise and increases the overall noise floor.

Figure 7:
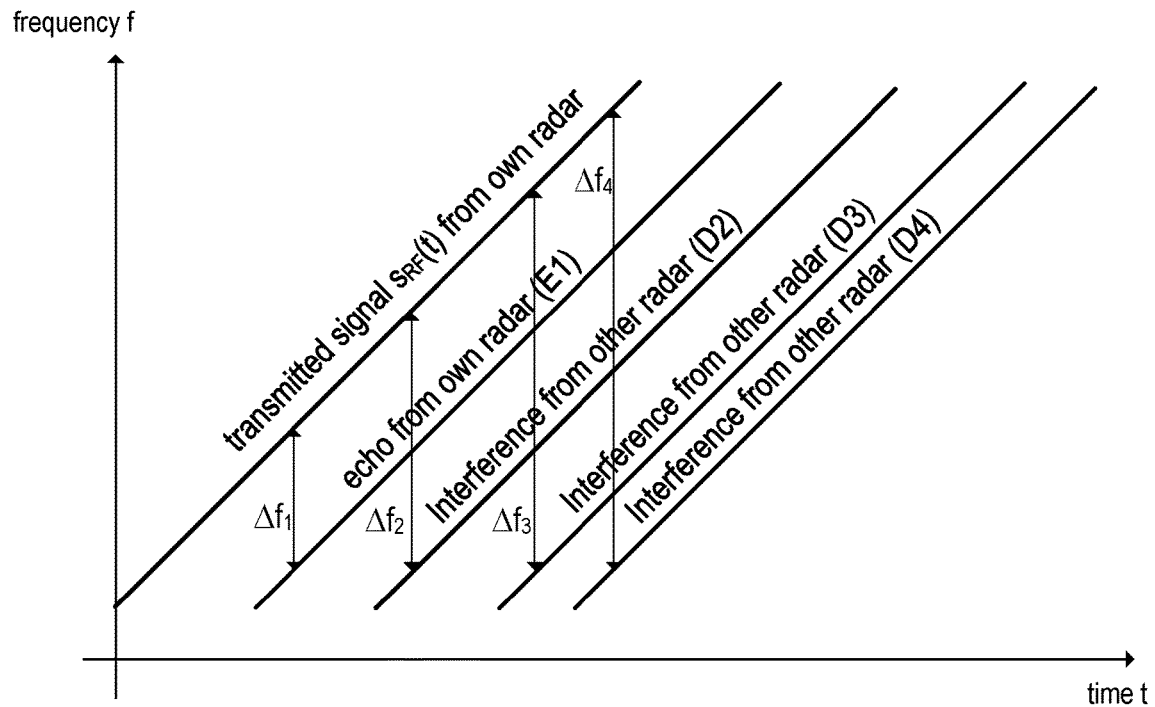
FIG. 7 is a diagram illustrating how interference may lead to the detection of so-called "ghost targets".

FIG. 7 includes a diagram illustrating a situation, in which the interfering signals (see, e.g., FIG. 3, signals D2, D3, D4) include chirps that have the same signal parameters and particularly have the same frequency slope and are the same frequency range as the chirps of the chirp sequences transmitted by the own radar sensor. As shown in the example of FIG. 7, the frequency differences between the radar signal transmitted by the own radar and the respective echo is $\Delta f_1$. When the interfering signals D2, D3, D4 have the same frequency slopes and are in the same frequency range, then the respective frequency differences $\Delta f_2$, $\Delta f_3$, and $\Delta f_4$ between the transmitted signal and the interfering signals D2, D3, and D4, respectively, may be stable within a whole acquisition sequence (see FIG. 4), and therefore the frequency differences $\Delta f_2$, $\Delta f_3$, and $\Delta f_4$ can be misinterpreted as so-called ghost targets when using known radar signal processing techniques. The approaches discussed further below aim at solving the problem of ghost targets by applying an additional amplitude modulation to the chirp signals transmitted by a radar sensor. Amplitude modulation is used to transmit information (e.g. a binary code modulated onto the chirps of the transmitted radar signal by amplitude modulation) with the transmitted radar signal that allows to identify the sender of the radar signal and thus to distinguish, in the received radar signal, a radar echo of the radar signal transmitted by the own radar sensor from interfering signals transmitted from other radar sensors.

Before discussing the mentioned amplitude modulation in more detail, some general aspects of radar sensors are summarized to provide useful background information.

Figure 8:
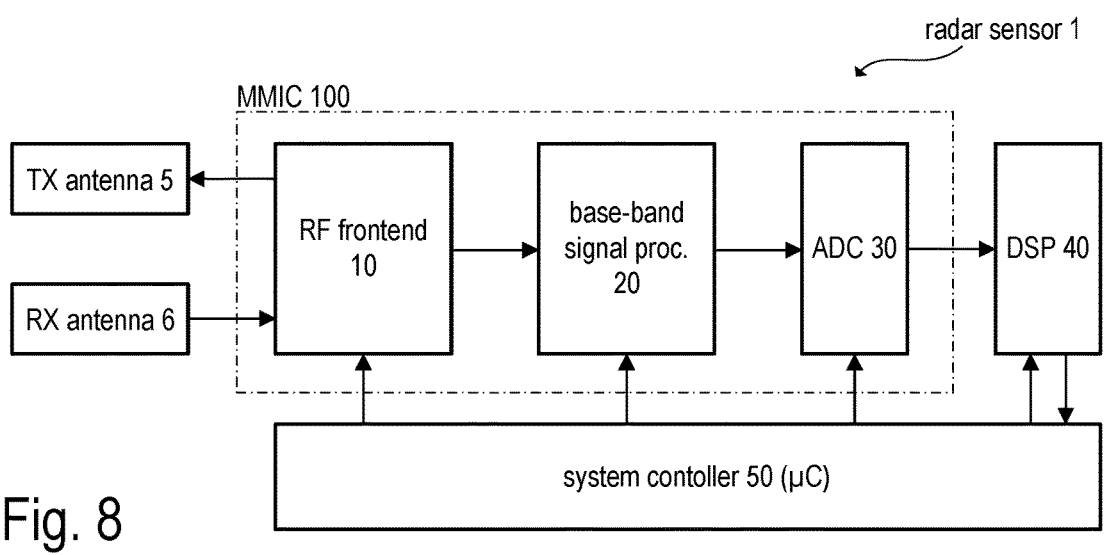
FIG. 8 is a block diagram illustrating the basic structure of an FMCW radar device.

FIG. 8 is a block diagram that illustrates an example structure of radar sensor 1. Accordingly, at least one transmission antenna 5 (TX antenna(s)) and at least one reception antenna 6 (RX antenna(s)) are connected to an RF frontend 10, which may be integrated in a semiconductor chip, usually referred to as monolithic microwave integrated circuit (MIMIC). The RF frontend 10 may include all the circuit components needed for RF signal processing. Such circuit components may include, for example, a local oscillator (LO), RF power amplifiers, low noise amplifiers (LNAs), directional couplers such as rat-race-couplers and circulators, and mixers for the down-conversion of RF signals (e.g. the received signal $y_{RF}(t)$, see FIG. 1) into the base-band or IF-band. As mentioned, antenna-arrays may be used instead of single antennas. The depicted example shows a bistatic (or pseudo-monostatic) radar system, which has separate RX and TX antennas. In case of a monostatic radar system, a single antenna or a single antenna array may be used for both, receiving and transmitting electromagnetic (radar) signals. In this case, a directional coupler (e.g. a circulator) may be used to separate RF signals to be transmitted to the radar channel from RF signals received from the radar channel.

In the case of a frequency-modulated continuous-wave (FMCW) radar sensor, the RF signals radiated by the TX antenna 5 may be in the range between approximately 20 GHz (e.g. 24 GHz) and 81 GHz (e.g. about 77 GHz in automotive applications). As mentioned, the RF signal received by the RX antenna 6 includes the radar echoes, i.e. the signals that have been back-scattered at the radar target(s). The received RF signal $y_{RF}(t)$ is down-converted into the base band and further processed in the base-band using analog signal processing (see FIG. 8, base-band signal processing chain 20), which basically includes filtering and amplification of the base-band signal and thus determines the bandwidth of the received signal (cf. FIG. 5, bandwidth B). The base-band signal is finally digitized using one or more analog-to-digital converters 30 and further processed in the digital domain (see FIG. 3, digital signal processing chain implemented, e.g., in digital signal processor 40). The overall system is controlled by a system controller 50, which may be at least partly implemented using a processor executing appropriate firmware. The processor may be included, e.g. in a microcontroller, a digital signal processor, or the like. The digital signal processor 40 (DSP) may be part of the system controller 50 or separate therefrom. The RF frontend 10 and the analog base-band signal processing chain 20 (and optionally the ADC 30) may be integrated in a single MMIC. However, the components may be distributed among two or more integrated circuits.

Figure 9:
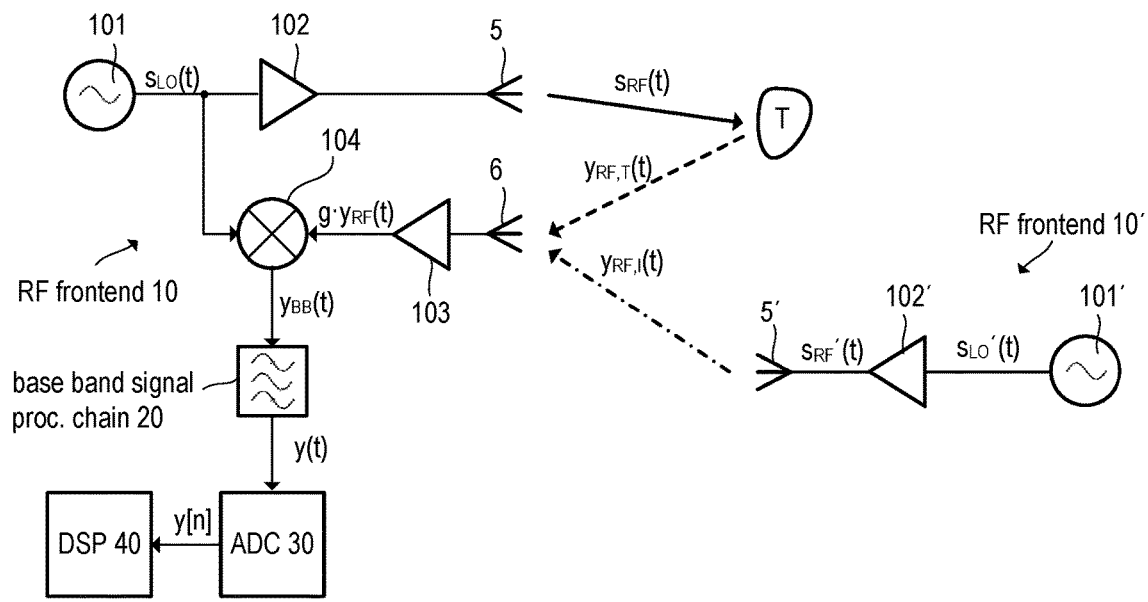
FIG. 9 is a circuit diagram illustrating one example of an analog RF frontend of a radar sensor and an analog RF frontend of an interferer.

FIG. 9 illustrates one example implementation of the RF frontend 10, which may be included in the radar sensor shown in FIG. 8. It is noted that FIG. 9 is a simplified circuit diagram illustrating the basic structure of an RF frontend. Actual implementations, which may heavily depend on the application, may be more complex. In particular many practical implementations include multiple reception and transmission channels, wherein only one reception channel and one transmission channel are shown in the depicted example to keep the illustration simple. The RF frontend 10 includes a local oscillator (LO) 101 that generates a RF signal $s_{LO}(t)$, which may be frequency-modulated as explained above with reference to FIGS. 2 and 4. The signal $s_{LO}(t)$ is also referred to as LO signal). In radar applications, the LO signal is usually in the SHF (Super High Frequency) or the EHF (Extremely High Frequency) band, e.g. between 76 GHz and 81 GHz in automotive applications.

The LO signal $s_{LO}(t)$ is processed in the transmit signal path (transmission channel) as well as in the receive signal path (reception channel). The transmit signal $s_{RF}(t)$, which is radiated by the TX antenna 5, is generated by amplifying the (frequency-modulated) LO signal $s_{LO}(t)$, e.g., using an RF power amplifier 102. The output of the amplifier 102 is coupled to the TX antenna 5 e.g. via strip lines, a coupler, matching network, etc. (not shown in FIG. 9). The received signal $y_{RF}(t)$, which is provided by the RX antenna 6, is provided to a mixer 104. In the present example, the received signal $y_{RF}(t)$ (i.e. the antenna signal) is pre-amplified by RF amplifier 103 (e.g. by a low-noise amplifier, LNA, with gain g), so that the mixer receives the amplified signal $g \cdot y_{RF}(t)$ at its RF input. The mixer 104 further receives the frequency-modulated LO signal $s_{LO}(t)$ at its reference input and is configured to down-convert the amplified signal $g \cdot y_{RF}(t)$ into the base band. The resulting base-band signal at the mixer output is denoted as $y_{BB}(t)$. The base-band signal $y_{BB}(t)$ is further processed by the analog base band signal processing chain 20 (see also FIG. 8), which basically includes one or more filters (e.g. a band-pass or a low-pass) to remove undesired side bands and image frequencies as well as one or more amplifiers. The analog output signal of the base-band signal processing chain 20 is denoted as y(t) and is may be supplied to an analog-to-digital converter (ADC) 30 (see also FIG. 8). The digital signal y[n] output by the ADC 30 is referred to as digital radar signal that includes the digital radar data. The digital radar signal may be supplied to a processor such as digital signal processor 40, which is programmed to further process the digital radar signal, e.g. by applying algorithms summarized as Range/Doppler processing. The implementation of the circuit components shown in FIG. 9 are as such known in the context of a radar sensor and thus not further explained in more detail.

FIG. 9 also illustrates how a desired radar echo and a radar signal transmitted by another radar sensor interfere. FIG. 9 further shows the radar frontend 10' of a further radar sensor, wherein only the local oscillator 101' and the transmission channel (including amplifier 102') and the transmission antenna 5' are shown to keep the illustration simple. The further radar sensor radiates a signal $s_{RF}'(t)$. The resulting RF signal arriving at the reception antenna 6 of the first radar sensor is denoted as RF interference signal $y_{RF,I}(t)$. The reception antenna 6 of the first radar sensor receives the RF interference signal $y_{RF,I}(t)$ together with the desired RF echo signal $y_{RF,T}(t)$ caused by the radar target T, at which the signal $s_{RF}(t)$ radiated by the first radar sensor is back-scattered.

Both, the radar echo $y_{RF,T}(t)$ and the interference signal $y_{RF,I}(t)$ are received by the antenna 6 and superpose at the RF input of mixer 104 ($y_{RF}(t)=y_{RF,T}(t)+y_{RF,I}(t)$). It can be seen from FIG. 9 that the interference signal component $y_{RF,I}(t)$ of the received signal $y_{RF}(t)$ is down-converted into the base band in the same way as radar echoes $y_{RF,T}(t)$ included in the received signal $y_{RF}(t)$. Accordingly, when the frequency difference between the instantaneous frequency $f_{LO}$ of the transmit signal $s_{RF}(t)$ and the instantaneous frequency of the received interference signal $y_{RF,I}(t)$ lies within the bandwidth B of the base-band signal processing chain 20, interference will also be present in the digital signal y[n].

Two approaches that aim at cancelling interference in the digital domain are time domain thresholding (TDT) and frequency domain thresholding (FDT). Both methods adaptively calculate a threshold which is used to discriminate radar echoes from real targets from interference. However, finding a threshold that allows a reliable discrimination between radar echoes and interference may be difficult in real-world scenarios. Moreover, as mentioned above, ghost targets may be falsely detected by the subsequent digital signal processing if the RF radar echo $y_{RF,T}(t)$ and the interference signal $y_{RF,I}(t)$ includes chirps in the same frequency band and with the same or a similar frequency slope.

As mentioned above, amplitude modulation may be used to additionally encode a chirp signal in order to transmit information that allows to distinguish, in the received radar signal, a radar echo of the radar signal transmitted by the own radar sensor from interfering signals transmitted from other radar sensor. The transmitted information may be unique for each radar sensor. Alternatively, the transmitted information may be (pseudo-) randomly chosen and regularly changed by a radar sensor. The modulation index of the amplitude modulation is low enough (e.g. in the range of 0.05 to 0.5 or 0.1 to 0.2) so that the amplitude modulation does not significantly affect the detection of radar targets using standard radar signal processing techniques. However, it allows detected ghost targets to be identified and discarded.

Figure 10:
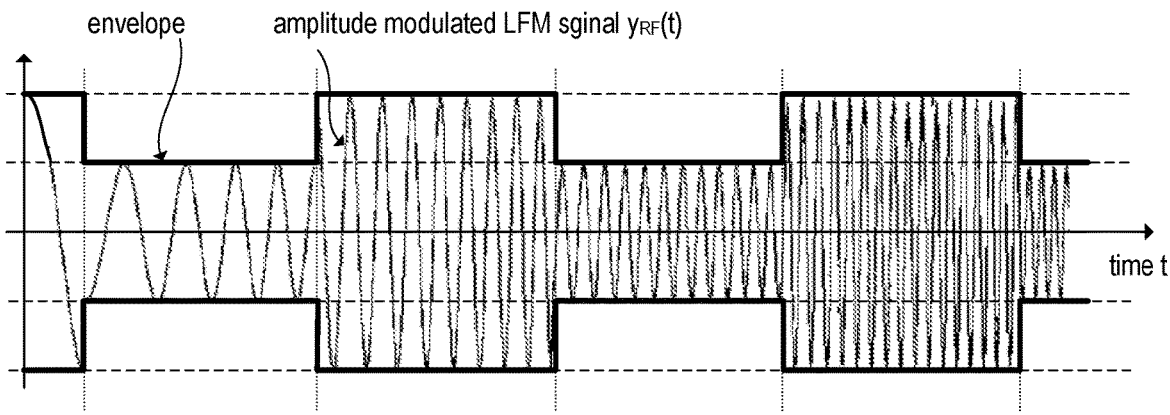
FIG. 10 is a diagram showing a waveform of one example of an amplitude modulated chirp signal.
Figure 11:
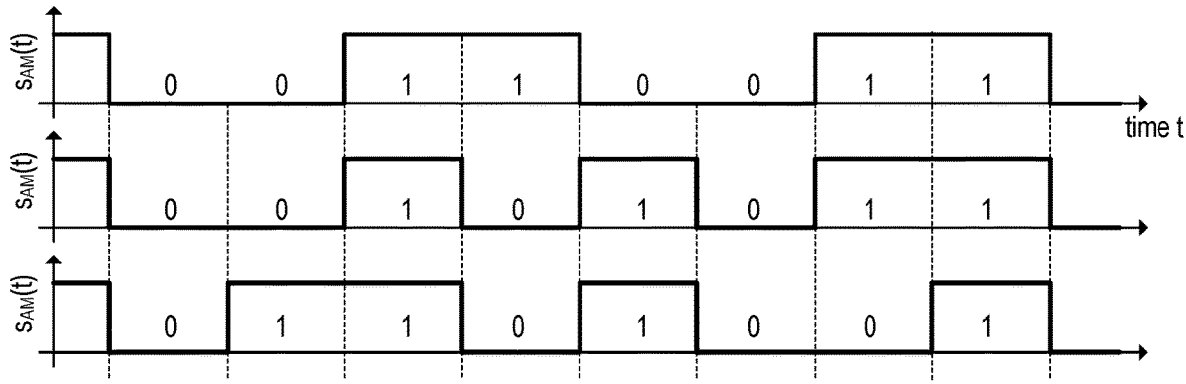
FIG. 11 illustrates different examples of binary modulation signals used to modulate the amplitude of a chirp.

FIG. 10 illustrates one example of a linear chirp with linearly increasing frequency and with an additional amplitude modulation. The shape of the modulation signal used for the amplitude modulation corresponds to the shape of the envelope of the linear chirp. The modulation signal may be, for example, a binary signal (having only two, i.e. low and high signal levels) that represents a bit-stream. In the above-mentioned example of a modulation index of 0.2, the low signal level and the high signal level of the binary modulation signal $s_{AM}(t)$ correspond to a signal amplitude of 80% and, respectively, 100% of the amplitude of the frequency modulated chirp signal. The bit-stream is the serial representation of a digital word, which can be used as a unique identifier code for a radar sensor. Using, e.g., a 40 bit word would allow to distinguish over a thousand billion radar devices. Some bits of the digital word may be used for the implementation or error correction techniques (e.g. parity bits, cyclic-redundancy-check, etc.). FIG. 11 illustrates three different examples of binary modulation signals $s_{AM}(t)$ used to modulate the amplitude of the chirps generated by three different radar sensors. Before explaining the processing of radar signals that include amplitude modulated chirps in more detail, a standard processing technique, which is usually referred to as Range/Doppler processing is discussed. Range/Doppler processing is commonly used in radar sensors to detect radar targets in the range/velocity domain represented by a so-called Range/Doppler Map (see FIG. 12).

The binary code, represented by the mentioned bitstream/ digital word, is modulated onto each individual chirp included in the frequency-modulated RF oscillator signal (LO signal). That is, during each chirp of the signal amplitude RF oscillator signal $s_{LO}(t)$, the amplitude is modulated in accordance with the digital word, representing the identifier code of the radar device, and this modulation is repeated for each chirp (cf. FIG. 10 showing one amplitude-modulated chirp). As a consequence, each chirp contains the same information represented by the modulated amplitude of the chirp. If the radar device includes multiple transmission channels for transmitting radar signals, the chirps included in the transmitted radar signals of each channel are amplitude-modulated in the same way, and the same identifier code is used in all channels.

Figure 12:
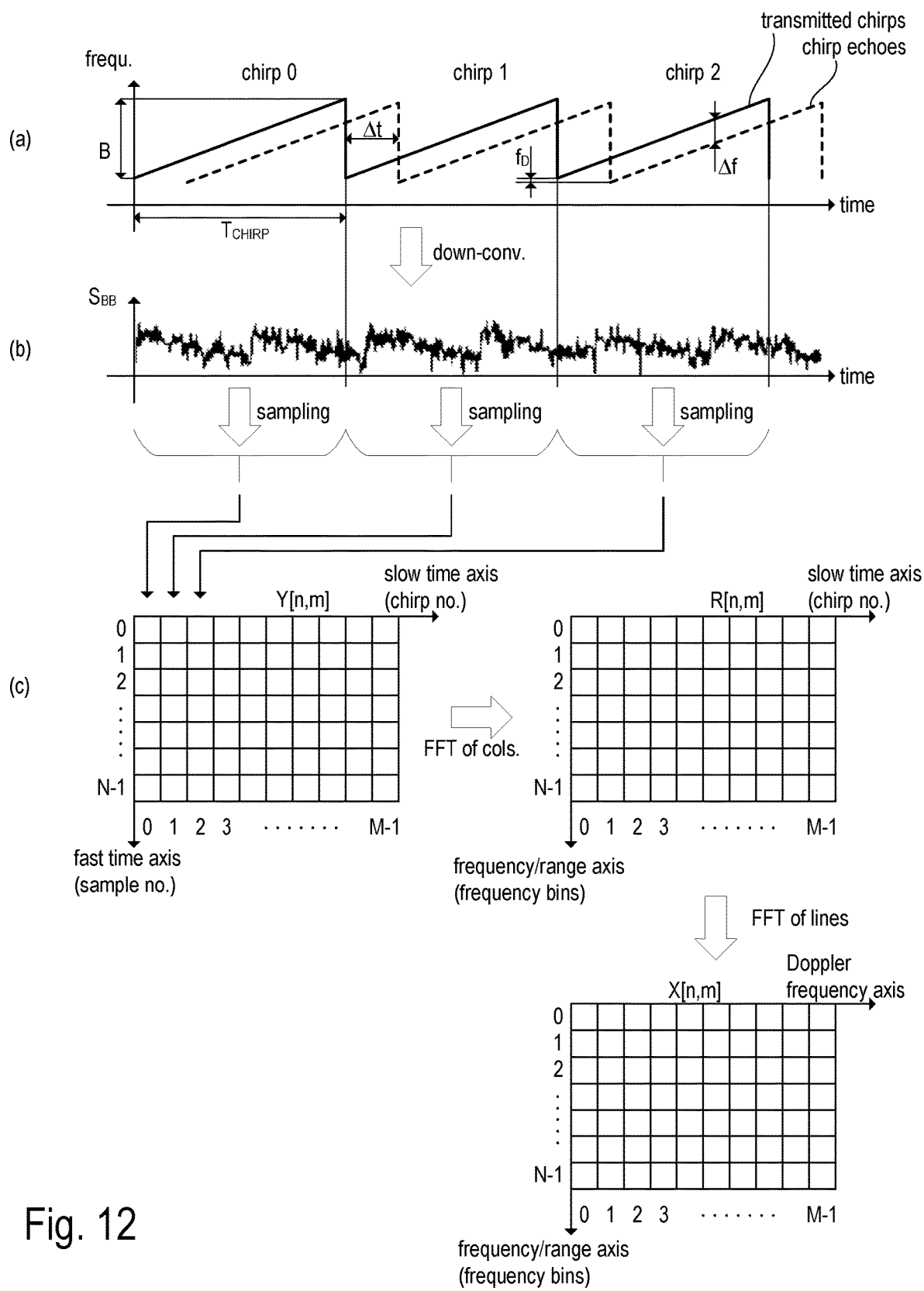
FIG. 12 illustrates the concept of Range Doppler Signal Processing commonly used in radar sensors.

FIG. 12 illustrates the signal processing used in an FMCW radar sensor that radiates a frequency-modulated radar signal. Diagram (a) of FIG. 12 illustrates frequency over time of an outgoing radar signal (solid line, cf. FIG. 9, signal $s_{RF}(f)$) and the respective incoming radar signal (dashed line, cf. FIG. 9, signal $y_{RF}(t)$). Accordingly, the frequency of the outgoing radar signal linearly increases from a start frequency $f_{START}$ to a stop frequency $f_{STOP}$ (chirp no. 0), then falls back to $f_{START}$ and again increases until the stop frequency $f_{STOP}$ is reached (chirp no. 1), and so on. As already mentioned with reference to FIG. 4, the outgoing radar signal is composed of a sequence of "frequency ramps" also referred to as "chirp signals" or "chirps". Dependent on the application, a defined modulation pause may be inserted between two contiguous chirps, wherein the radar signal may remain at the stop frequency or the start frequency during the pause (or any frequency between stop and start frequency). The duration $T_{CHIRP}$ of one chirp may be in the range from a few microseconds up to a few milliseconds, e.g. 20 µs to 2000 µs. The actual values may be, however, greater or lower dependent on the application.

The incoming radar signal (received by an RX antenna) lags, with respect to the outgoing radar signal (radiated by the antenna), by a time lag Δt due to the travel time of the radar signal from the TX antenna to the radar target (at which the radar signal is back-scattered) and back to the RX antenna. The time lag Δt is often referred to as round trip delay RTD. The distance $d_T$ of the radar target from the radar sensor is $d_T = c \cdot \Delta t / 2$, i.e., the speed of light c times half of the time lag Δt. As can be seen from FIG. 12, diagram (a), the time lag Δt results in a frequency shift Δf, which can be determined by down-mixing the incoming signal (see FIG. 4, mixer 104, diagram (b) of FIG. 12), digitizing the base-band signal, and performing a subsequent digital spectral analysis; the frequency shift appears as so-called "beat frequency" in the base-band signal. When using a linear chirp (i.e. a saw-tooth-shaped modulation signal) the time lag $\Delta t$ can be calculated as $\Delta t = \Delta f/k$, wherein the factor k represents the slope (steepness) of the frequency ramp, which may be calculated as $k = (f_{STOP} - f_{START})/T_{CHIRP}$.

Although the basic operation principle of a FMCW radar sensor has been outlined above, it should be noted that more sophisticated signal processing may be applied in practice. In particular, an additional frequency shift $f_D$ of the incoming signal due to the Doppler effect may cause an error in the distance measurement, because the Doppler shift $f_D$ adds to the frequency shift $\Delta f$, which is due to the travel time $\Delta t$ (round trip delay RTD) of the radar signal, as explained above. Dependent on the application, the Doppler shift may also be estimated from the outgoing and incoming radar signals, whereas, in some applications, the Doppler shift may be negligible for distance measurement. This may, in particular, be the case when the chirp duration $T_{CHIRP}$ is short, so that the frequency shift $\Delta f$ will be high as compared with the Doppler shift $f_D$ for any distance within the measuring range of the radar sensor. In the present example, the frequency of the radar signal increases from $f_{START}$ to $f_{STOP}$, which results in a so-called "up-chirps". However, the same measurement techniques can also be applied with "down-chirps", that is when the stop frequency $f_{STOP}$ is lower than the start frequency $f_{START}$ and the frequency decreases from $f_{START}$ to $f_{STOP}$ during a chirp. In some radar systems, the Doppler shift may be eliminated, when the distance is calculated based on an "up-chirp" and on a "down-chirp". Theoretically, the actual measured distance $d_T$ of a radar target can be calculated as the average of a distance value obtained from the up-chirp echo and a distance value obtained from the down-chirp echo; by means of the averaging the Doppler shift is cancelled out.

As indicated above, the distance $d_T$ of the radar target from the radar sensor may be calculated as $$d_T = c \cdot \Delta f \cdot T_{CHIRP}/(2 \cdot B), \tag{1}$$

wherein $\Delta f$ denotes the beat frequency and B denotes the bandwidth of the chirp ($B = |f_{STOP} - f_{START}|$). Accordingly, the basic signal processing of linear FMCW radar involves determining the beat frequency $\Delta f$ by spectral analysis. As mentioned, the Doppler effect has to be considered in order to determine the radar target's velocity (relative to the radar sensor). This can be done based on the mentioned Range-Doppler maps, which can be calculated using Range-Doppler Processing, which is one example of a standard digital signal processing technique to process digital FMCW radar signals (see FIG. 9, DSP 40)

Range-Doppler Processing includes the calculation of Range-Doppler Maps (also referred to as Range-Doppler Images). Generally, linear FMCW radars obtain target information (i.e. distance, angle, and velocity of a radar targets) by transmitting a sequence of linear chirps and mixing (down-converting) the delayed chirp echoes (see FIG. 9, signal $y_{RF}(t)$) from the targets with a copy of the transmitted signal (see FIG. 9, mixer 104 receiving signals $s_{LO}(t)$). The down-converted chirp echoes are illustrated in diagram (b) of FIG. 12 (analog base band signal y(t), see FIG. 9). The target range information (i.e. the distance between sensor and a radar target) can be extracted from the spectrum of this down-converted signal. Therefore, the down-converted chirp echoes are digitized (see FIG. 9, ADC 30) to obtain the digital radar signal y[n]. A Range-Doppler map can be obtained, e.g., by a two-stage Fourier transformation as described below in more detail. Range-Doppler maps can be used as a basis for various target detection, identification and classification algorithms.

In the examples depicted herein, a digital signal processor (DSP) is used as a computing unit to perform the calculations needed to obtain the Range Map. It is noted, however, that the required computations may be performed by various hardware and software entities and combinations thereof, and generally, the terms computing unit and processor cover any hardware or combination of hardware and software that is capable and configured to execute the calculations described in connection with the implementations described herein.

The common method for calculating the Range-Doppler maps includes two steps, wherein each step includes the calculation of several Fourier Transforms, usually implemented using a Fast Fourier Transform (FFT) algorithm. In the following discussion the term "chirp echo" is used to denote the digitized base band signal corresponding to one RF chirp echo received from the antenna. Further, in the present example, it is assumed that the digital radar signal y[n] provided by the ADC 30 (see FIG. 9) includes N×M samples representing M chirp echoes, wherein each chirp echo is composed of N samples (sampling time interval $T_{SAMPLE}$). These N×M samples can be arranged in a two-dimensional array Y[n, m] (see diagram (c) of FIG. 12) with N lines and M columns. Each column of the array Y[n, m] represents one chirp. The $n^{th}$ line of the array Y[n, m] includes the $n^{th}$ sample of each chirp. The line index n may also be seen as discrete time values $n \cdot T_{SAMPLE}$ on a "fast" time axis. Similarly, the column index m (chirp number) may be seen as discrete time values $m \cdot T_{CHIRP}$ on a "slow" time axis.

In a first stage, a first FFT (usually referred to as Range FFT) is applied to each chirp echo, i.e. to each column of the array Y[n, m]. That is, the FFT is calculated for each one of the M columns of the array Y[n, m]. In other words, the FFT is applied to the array Y[n, m] along the "fast" time axis. The resulting Fourier transforms can also be arranged in a two-dimensional array, referred to as Range Map R[n, m], wherein the M columns include the Fourier transforms of the M chirps. Each one of the N lines includes the (complex valued) spectral values for a specific discrete frequency value. Accordingly, the index n running from 0 to N−1 represents a discrete frequency value which is often referred to as frequency bin. The Range Map R[n, m] is illustrated in diagram (c) of FIG. 12. A radar echo from a target will result in a peak appearing at a specific frequency bin. Usually the peak will appear in all columns, i.e. in all (Fourier transformed) chirp echoes. The frequency value of the frequency bin can be converted into range information, e.g. according to eqn. (1). In other words, the index n in the Range Map [n, m] can be assigned to a range value.

In a second stage, a second FFT (usually referred to as Doppler FFT) is applied to each one of the N lines of the Range Map R[n, m]. Each line of the Range Map R[n, m] includes the M spectral values of the M chirps for a specific frequency bin, wherein each frequency bin corresponds to a specific range/distance of a radar target. In other words, the FFT is applied to the Range Map R[n, m] along the "slow" time axis. The resulting Fourier transforms can also be arranged in a two-dimensional array, referred to as Range/Doppler Map X[n, m]. A radar echo from a target will result in a peak appearing in a specific position of the Range/Doppler Map X[n, m]. As mentioned, the line number $n \in [0, \ldots, N-1]$ in which the peak appears represents the frequency bin, and the respective frequency value can be converted into range information, e.g. according to eqn. (1). The column number m∈[0, . . . , M−1] in which the peak appears represents the Doppler frequency (frequency shift due to the Doppler effect) that can be converted into velocity information. In the case of more than one RX antenna, a Range/Doppler Map $X_a[n, m]$ may be calculated for each antenna, wherein a denotes the index of the respective RX antenna (a=0, 1, . . . A−1, A denoting the number of RX antennas). The A Range/Doppler Maps $X_a[n, m]$ may be stacked to a three-dimensional array. The corresponding arrays $Y_a[n, m]$, which includes the digital radar signals for all antennas, are sometimes referred to as "radar data cube". It is understood that the parameters N and M may be equal but, in general, will be different. For example, one acquisition sequence (cf. FIG. 4) may include M=256 chirps, wherein each chirp is represented by N=512 samples.

As mentioned, radar data cubes, or the resulting Range Maps R[n, m] or Range-Doppler Maps X[n, m] may be used as input data for various signal processing techniques to detect radar targets in the surrounding (field of view) of the radar sensor. For example, various peak detection algorithms are known for detecting peaks (i.e. local maxima, FFT peaks) in the Range Map or the Range/Doppler Map caused by objects (radar targets) in the radar channel. That is, a target may be detected if a value in the Range Map or the Range Doppler Map exceeds a specific threshold. However, more complex detection algorithms may also be used. Additional signal processing steps are performed to obtain, from the detected FFT peaks, a list of radar targets and the respective range and velocity information.

Figure 13:
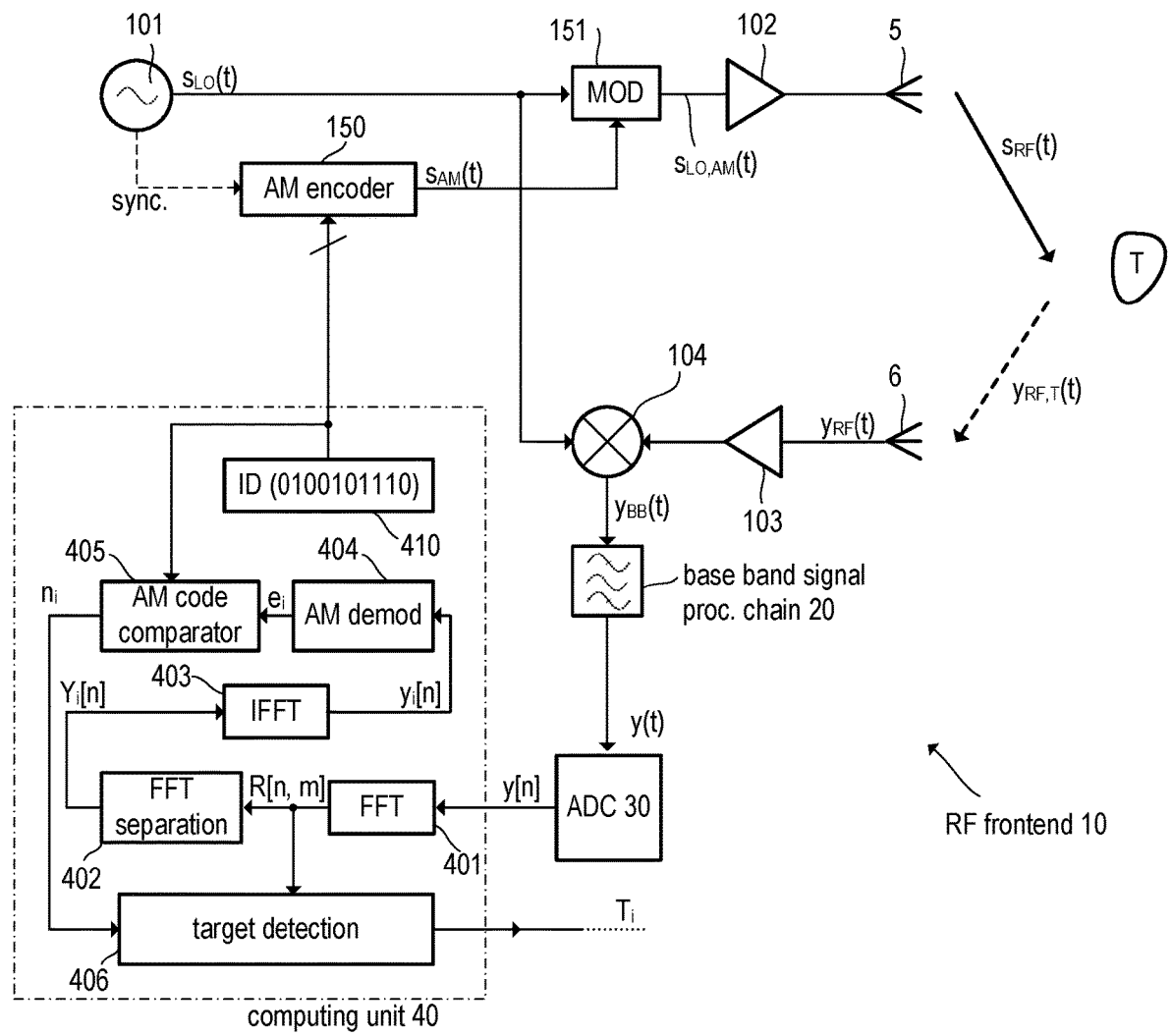
FIG. 13 is a circuit diagram illustrating one implementation of a radar transceiver configured to generate and process amplitude modulated chirp signals.

As mentioned further above, in practical applications such as in automotive radar systems situations may occur, in which so called ghost targets are detected. Such ghost targets may be caused by radar signals generated by other radar sensors, when the chirp sequences of the radar sensors are in the same frequency range and the slope of the chirps is the same or similar. In order to enable a radar sensor to distinguish real echoes of its own transmitted radar signals from "foreign" radar signals, an additional amplitude modulation may be applied to the (frequency-modulated) chirps. Thereby, the signal used for amplitude modulation carries information that allows the radar sensor to identify its "own" chirp echoes. An example of an amplitude-modulated chirp has been shown in FIG. 10, and examples of suitable modulation signals have been shown in FIG. 11. FIG. 13 illustrates one example of a radar transceiver including the RF frontend 10, the base-band signal processing chain 20, the analog-to-digital conversion 30 and the computing unit 40 used for the digital signal processing of the digital radar signal y[n]. The basic structure of the analog components shown in FIG. 13 are similar to the example of FIG. 9 and reference is made to the respective explanations above; the following discussion will thus concentrated on the additional components used for amplitude modulation (AM) and the respective digital signal processing.

As compared with the previous exempla of FIG. 9, the present example of FIG. 13 includes an additional modulator 151 coupled to the amplifier 102 upstream thereto. That is, the modulator 151 receives the frequency modulated LO signal $s_{LO}(t)$ and modulates the amplitude of the LO signal $s_{LO}(t)$ in accordance with a modulation signal $s_{AM}(t)$ (cf. FIG. 11) provided by AM encoder 150. In other implementations, the modulator 151 may be coupled to the amplifier 102 downstream thereto. The sequence of amplitude modulated chirps is denoted as signal $s_{LO,AM}(t)$ which is amplified by amplifier 102 and radiated—as RF radar signal $s_{RF}(t)$— by transmission antenna 5. The AM encoder 150 is synchronized with the LO 101 so that the modulation signal $s_{AM}(t)$ can be generated synchronously with the individual chirps. As such, each chirp may be amplitude-modulated in the same manner. As mentioned in connection with FIG. 11, the modulation signal $s_{AM}(t)$ may represent a binary sequence (i.e. a bitstream) which is generated in accordance with a digital word ID. In the present example the digital word is a unique number used as identifier and stored in a register 410, which may be included in the computing unit 40.

The received radar signal $y_{RF}(t)$ that may include RF chirp echoes and ghost echoes is down-converted by the mixer 104 using the LO signal $s_{LO}(t)$, the down-converted signal y(t) (base band signal) is digitized, and the resulting digital radar signal y[n] is supplied to the computing unit 40 (e.g. a signal processor). As explained above with reference to FIG. 12, the samples of one data acquisition (range measurement, see FIG. 4) included in the digital radar signal y[n] may be arranged in an array Y[n, m], wherein each of the m columns of Y[n, m] includes n samples representing one chirp echo (in the base band). The column-wise Fourier transform of the array Y[n, m] yields the Range Map R[n, m]. The FFT unit 401 shown in FIG. 13 is configured to calculate the Range Map R[n, m] from the digital radar signal y[n]. The Range Map R[n, m] is supplied to the target detection unit 406, which is configured to detect radar targets $T_i$ from the data included in the Range Map R[n, m]. The target detection unit 406 may further be configured to calculate a Range/Doppler Map X[n, m] during this detection process. The detected targets $T_i$ are represented by the respective range and velocity information.

The target detection unit 406 receives information about which of the frequency bins of the Range Map R[n, m] include data, in which the identifier ID of the radar sensor has been detected, which has also been used for amplitude modulation of the transmitted radar signals. This allows the target detection unit 406 to discriminate "own" radar echoes from ghost echoes. The following explanations relate to the detection of the identifier ID (which has been used for AM in the transmission path) in the received radar data. This detection process includes for one or more of the chirp echo signal (columns) in the matrix Y[n, m] separating potential radar echoes (which are indicative of real targets and ghost targets) in the frequency domain, which is basically achieved by a band-pass filtering in the frequency domain. In the present example, this separation of potential radar echoes is done by the FFT separation unit 402, and the spectra of potential radar echoes are denoted as $Y_i[n]$ (index i denotes a particular radar echo from a particular Target $T_i$). In this context, the term "chirp echo signals" again refers to the base band signals obtained by down-conversion of the RF chirp echo signals. The function of the FFT separation unit 402 will be discussed in more detail later with reference to FIG. 14. The spectra $Y_i[n]$ are transformed back into the time domain, e.g. using an inverse FFT (IFFT) algorithm implemented by the IFFT unit 403, wherein the spectra $Y_i[n]$ may be transformed sequential or in parallel dependent on the actual implementation.

The resulting time domain signals $y_i[n]$ will show an amplitude modulation, if they have been caused by a radar signal including amplitude-modulated chirps including the correct identifier ID. Accordingly, the envelope of the signals $y_i[n]$ will match the modulation signal $s_{AM}(t)$ if the modulated chirps have been transmitted by the same radar sensor. Determining the envelope is basically a demodulation of the amplitude modulated signals $y_i[n]$, which is implemented by the demodulator 404 labeled "AM demod" in the example of FIG. 13. For each potential target $T_i$, the resulting envelope $e_i[n]$ is supplied to the AM code comparator unit 405, which is configured to compare the envelopes $e_i[n]$ with the identifier ID of the radar sensor and to decide, whether a particular envelope $e_i[n]$ matches with the identifier ID. In some implementations, the AM code comparator unit 405 may be configured to correlate the envelope $e_i[n]$ and the identifier ID and use a threshold to detect a match. However, other approaches, such as Wiener filtering or calculating a cross-correlation or a correlation coefficient, may be used. As mentioned, the target detection unit 406 is informed about which ones of the potential chirp echoes caused a match in the AM code comparator unit 405. The frequency bins associated with a potential chirp echo/radar target, for which the AM code could not be detected, can be discarded (e.g. filled with zeros in the Range Map R[n, m] before calculating the Range/Doppler Map.

Figure 14:
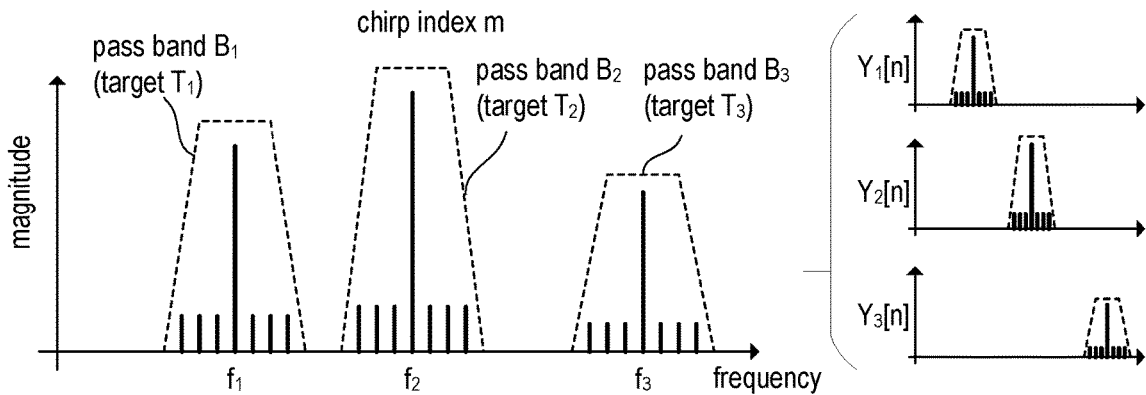
FIG. 14 is a diagram illustrating one example spectrum of the digital radar signal in the base band obtained from an amplitude-modulated chirp echo and including three peaks corresponding to three radar targets

FIG. 14 schematically illustrates one column of an example Range Map R[n, m], which includes three peaks at frequencies $f_1$, $f_2$, and $f_3$ (corresponding to frequency bins $n_1$, $n_2$, $n_3$) that indicate the presence of three potential radar targets $T_1$, $T_2$, $T_3$. Due to the amplitude modulation, the peaks are somewhat broadened; the information carried by the modulation signal $s_{AM}(t)$ is included in the frequency bins adjacent to the frequency bins $n_1$, $n_2$, and $n_3$ usually referred to as side bands. In other words, the amplitude modulation spreads the spectrum "occupied" by each radar target and thus reduces the resolution of frequency measurement (see also FIG. 17).

FIG. 14 further illustrates how the separation of potential chirp echoes may be implemented by the FFT separation unit 402. As explained above, the FFT separation unit 402 basically performs a band-pass filtering in the frequency domain. Accordingly, the spectral values within the passbands $B_1$, $B_2$, and $B_3$ enclosing the peaks at frequencies $f_1$, $f_2$, and $f_3$ are separated into different spectra $Y_1[n]$, $Y_2[n]$, and $Y_3[n]$, each of which includes only one of the pass bands $B_1$, $B_2$, and $B_3$ and is then transformed back into the time domain (see FIG. 13 IFFT unit 403).

Figure 15:
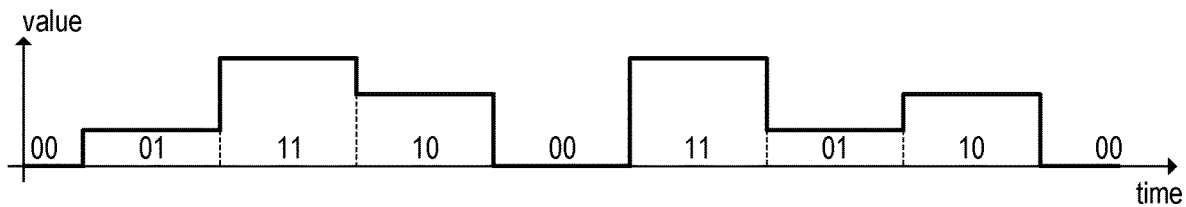
FIG. 15 illustrates an example of a quaternary modulation signal that may be used to generate an amplitude modulated chirp signal using quaternary ASK.

The bandwidth of the pass bands $B_1$, $B_2$, and $B_3$ shown in FIG. 14 depends on the code length of the identifier ID and thus on the number of bits or symbols to be transmitted in one chirp. As the length $T_{CHIRP}$ of one chirp is fixed the required bit rate or baud rate increases with the length of the identifier. In order to reduce the number of symbols to be transmitted with one chirp, a multi-level modulation signal $s_{AM}(t)$ may be used for amplitude modulation instead of a binary signal. FIG. 15 illustrates an example of a quaternary (4-ary) modulation signal $s_{AM}(t)$ (i.e. the signal can assume four different levels), and thus each symbol represents two bits. As can be seen for a given code length (e.g. 32 bit) using a multi-level modulation signal $s_{AM}(t)$ reduces the number of symbols to be transmitted. For example, using a quaternary modulation signal $s_{AM}(t)$ as shown in FIG. 15 instead of a binary modulation signal as shown in FIG. 11), halves the number of symbols to be transmitted with one chirp for a given code length. A lower number of symbols entails a lower bandwidth for the passbands $B_1$, $B_2$, and $B_3$ (cf. FIG. 14) and thus a higher resolution of the range measurement. Multi-level signals may also be referred to as L-ary signals with L being an integer number indicating the number of levels.

Figure 16:
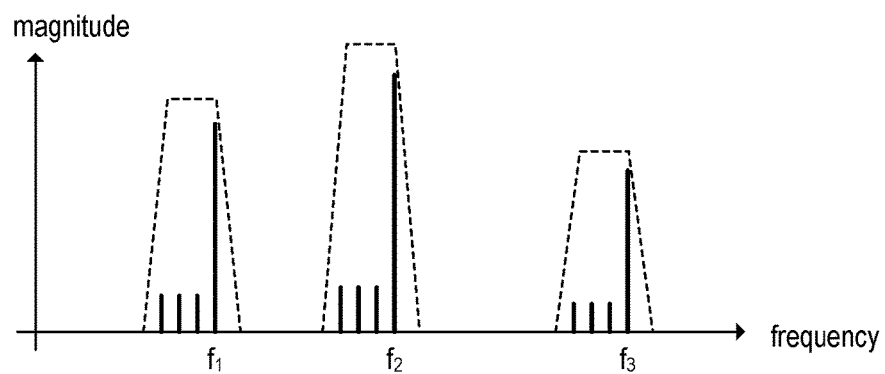
FIG. 16 is a diagram similar to FIG. 14 illustrating one example spectrum of the digital radar signal in the base band obtained from an amplitude-modulated chirp echo when using single side-band modulation.

Another option to further reduce the required bandwidth (and thus increase the achievable resolution) is to apply a single side-band (SSB) modulation instead of an amplitude modulation. The effect of using SSB modulation instead of AM is illustrated in FIG. 16, which illustrates a similar situation as FIG. 14; however, as SSB modulation is used instead of AM only one side-band (the lower or the upper sideband) added to the peaks caused by the radar targets. The bandwidth of the passbands $B_1$, $B_2$, and $B_3$ may thus be chosen, for example, two times smaller as in the situation of FIG. 14. It is noted that SSB modulation may be performed with binary modulation signals as well as with multi-level modulation signals. It is understood that SSB modulation is one variant of amplitude modulation. SSB modulation may be subdivided in SSB modulation with USB (upper side band) transmission or LSB (lower side band) transmission. In communication systems SSB modulation is usually performed with suppressed carrier, which is undesired in radar applications as, in the reception path, the carrier carries the most important information, namely the range information of radar targets.

Figure 17:
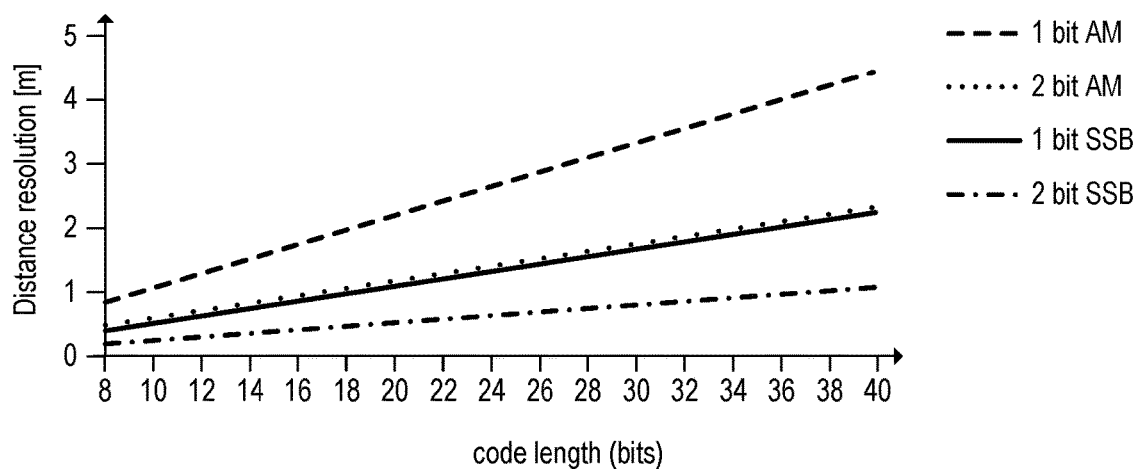
FIG. 17 is a diagram illustrating the achievable resolution for different code lengths and different amplitude modulation methods.

The diagram of FIG. 17 illustrates how the code length of the identifier ID affects the required bandwidth of the passbands used in the FFT separation unit 402 (see FIG. 13) and thus the achievable resolution for different modulation techniques. As can be seen from FIG. 17, the achievable resolution decreases with increasing code length (and thus increasing bit/baud rate). Further, the use of quaternary modulation signals yields a higher resolution than binary modulation signals and SSB modulation improves the resolution by a factor two.

Figure 18:
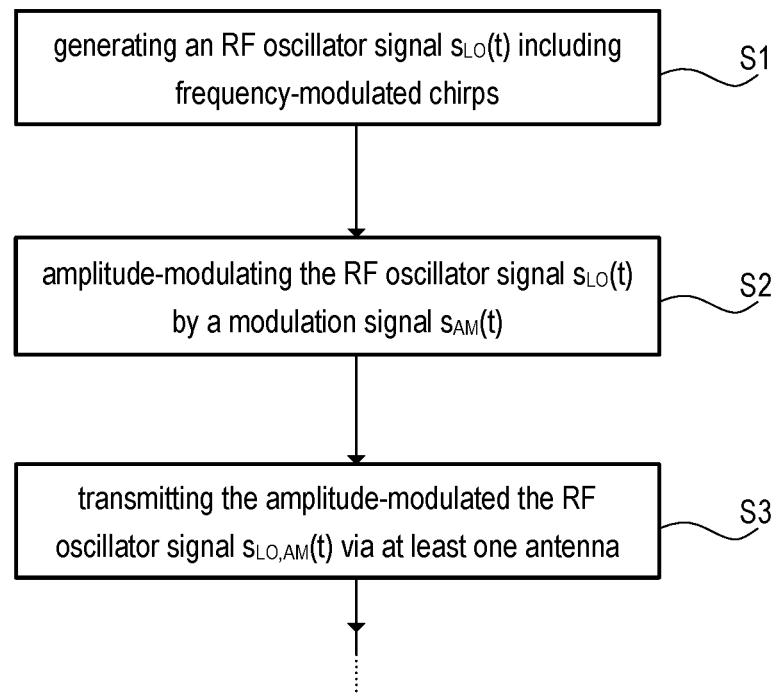
FIGS. 18 and 19 are flow charts illustrating example implementations of methods used in radar devices to identify ghost echoes.

FIG. 18 is a flow chart summarizing one example implementation of a method, which may be implemented in the radar device depicted in FIG. 13. According to the depicted example, the method includes generating an RF oscillator signal (cf. FIG. 13, LO-Signal $s_{LO}(t)$) which includes frequency-modulated chirps (see FIG. 18, block S1) and the amplitude-modulation of the RF oscillator signal by a modulation signal (see FIG. 18, block S2). Thereby, the modulation signal (cf. FIG. 13, signal $s_{AM}(t)$) may represent a unique identifier ID of the radar device. The amplitude-modulated RF oscillator signal (see FIG. 13, signal $s_{LO,AM}(t)$) is then transmitted via an antenna (cf. FIG. 13, TX-Antenna 6) (see FIG. 18, block S3).

In some implementations, the amplitude modulation is implemented such that the amplitude of each frequency-modulated chirp is modulated with the modulation signal, which represents an identifier ID as mentioned above. Accordingly, the information represented by the identifier ID is included in each individual chirp. The modulation index of the amplitude modulation may be in the range from 0.05 to 0.5, particularly in the range from 0.1 to 0.2. A tradeoff exists between the modulation index and the signal-to-noise ratio of the received radar echo signals as a high modulation index reduces the transmitted signal power. According to the actual implementation the modulation signal, which represents the identifier ID, is a dual level signal or a multi-level signal allowing more than two discrete signal levels.

Figure 19:
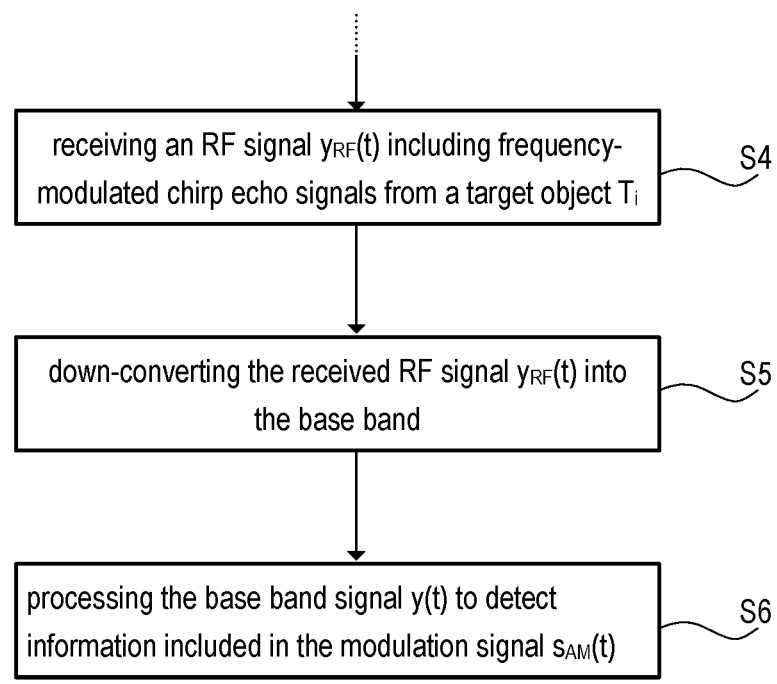

FIG. 19 is a flow chart illustrating one example of how the identifier modulated onto the transmitted chirps can be detected in the corresponding chirp echo signals included in the received radar signal. According to the depicted example, the method includes the reception of an RF signal (cf. FIG. 13, signal $y_{RF}(t)$) that is composed of frequency-modulated chirp echo signals from one or more target objects $T_i$ (see FIG. 19, block S4). The received RF signal is down-converted into the base band using the RF oscillator signal for providing a corresponding base band signal (see FIG. 19, block S5). Further, the method includes the processing of the base band signal (cf. FIG. 13, signal y(t)) to detect information, which is also included in the modulation signal used for amplitude modulation of the transmitted chirps (see FIG. 19, block S6).

In some implementations, the processing of the base band signal includes the correlation of a signal, which is based on the base band signal, and a signal that represents the modulation signal (and thus the identifier). In the example of FIG. 13, this correlation is performed by the AM code comparator 405. In some implementations, the processing of the base band signal includes digitizing the base band signal to obtain a digital signal (cf. FIG. 13, signal y[n]), calculating a Range Map (cf. FIG. 12, Range Map R[n, m]) based on the digital signal, wherein the Range Map includes a plurality of spectra corresponding to a plurality of chirp echo signals (i.e. the columns of the matrix Y[n, m] explained with reference to FIG. 12), and detection of one or more peaks in the spectra. The detected peaks are indicative of potential target objects $T_i$. For each detected peak, a time domain signal (cf. FIG. 13, $y_i$[n]) is calculated from the Range Map. The time domain signals can be used to check whether information (i.e. the identifier ID) included in the modulation signal is also included in the time domain signals. A potential target object $T_i$ may be discarded when the information included in the modulation signal is not included in the respective time domain signal.

The foregoing disclosure provides illustration and description, but is not intended to be exhaustive or to limit the implementations to the precise form disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

The invention claimed is:

1. A method comprising:
generating a radio frequency (RF) oscillator signal that includes frequency-modulated chirps;
amplitude-modulating the RF oscillator signal by using a modulation signal, representing an identifier code, and a modulation index to obtain an amplitude-modulated RF oscillator signal;
transmitting the amplitude-modulated RF oscillator signal via at least one antenna;
receiving a second RF signal, including frequency-modulated chirp echo signals, from a target object based on transmitting the amplitude-modulated RF oscillator signal;
down-converting the second RF signal into a base band using the RF oscillator signal to obtain a base band signal; and
processing the base band signal to detect information included in the modulation signal.

2. The method of claim 1, wherein amplitude-modulating the RF oscillator signal comprises:
modulating a respective amplitude of each frequency-modulated chirp, of the frequency-modulated chirps, with the modulation signal.

3. The method of claim 2, wherein the modulation index is not more than 0.5.

4. The method of claim 1, wherein the identifier code is a digital word.

5. The method of claim 1, wherein the modulation signal is a dual level signal or a multi-level signal allowing more than two discrete signal levels.

6. The method of claim 1, wherein amplitude-modulating the RF oscillator signal comprises:
applying a single side-band modulation to the RF oscillator signal to obtain the amplitude-modulated RF oscillator signal.

7. The method of claim 1, wherein processing the base band signal comprises:
digitizing the base band signal to obtain a digital signal,
calculating a range map based on the digital signal,
wherein the range map includes a plurality of spectra corresponding to a plurality of chirp echo signals;
detecting one or more peaks in the plurality of spectra indicative of a potential target object;
calculating a time domain signal from the range map for each of the one or more peaks; and
checking whether information included in the modulation signal is also included in the time domain signal.

8. The method of claim 7, further comprising:
discarding, based on processing the base band signal, the potential target object when the information included in the modulation signal is not included in the time domain signal.

9. The method of claim 1, wherein processing the base band signal comprises:
correlating a third signal, based on the base band signal, with a forth signal that represents the modulation signal.

10. A radar device comprising:
a radio frequency (RF) oscillator configured to generate an RF oscillator signal that includes frequency-modulated chirps;
a modulator configured to:
receive the RF oscillator signal and a modulation signal representing an identifier code, and
amplitude-modulate the RF oscillator signal using the modulation signal and a modulation index to obtain an amplitude-modulated RF oscillator signal;
one or more antennas configured to:
transmit the amplitude-modulated RF oscillator signal, and
receive a second RF signal including frequency-modulated chirp echo signals from a target object based on transmitting the amplitude-modulated RF oscillator signal;

a mixer configured to:
receive the amplitude-modulated RF oscillator signal and the second RF signal, and
down-convert the second RF signal into a base band to provide a base band signal;
an analog-to-digital converter configured to digitize the base band signal to obtain a digitized base band signal; and
a computing unit configured to process the digitalized base band signal to detect information included in the modulation signal.

11. The radar device of claim 10, further comprising:
an encoder unit configured to generate the modulation signal based on the identifier code,
wherein the modulator, when amplitude-modulating the RF oscillator signal, is configured to:
modulate each of the frequency-modulated chirps with the modulation signal.

12. The radar device of claim 10, wherein the modulator is a single side band modulator.

13. The radar device of claim 10, wherein the computing unit is further configured to:
calculate a range map that includes a plurality of spectra corresponding to a plurality of chirp echo signals;
detect one or more peaks in the plurality of spectra indicative of a potential target object;
calculate a time domain signal from the range map for each of the one or more peaks; and
check whether information included in the modulation signal is also included in the time domain signal.

14. The radar device of claim 13, wherein the computing unit is further configured to:
discard, based on processing the digitalized base band signal, a potential target object when the information included in the modulation signal is not included in the time domain signal.

15. The radar device of claim 10, wherein the computing unit is further configured to:
correlate a third signal, based on the base band signal, with a fourth signal that represents the modulation signal.

16. The radar device of claim 10, wherein at least the RF oscillator and the mixer are integrated in a semiconductor chip.

17. The radar device of claim 10, wherein the one or more antennas include a single antenna array configured to both receive and transmit signals.

18. The radar device of claim 10, wherein the one or more antennas are configured to transmit the amplitude-modulated RF oscillator signal in a range from 20 gigahertz (GHz) to 81 GHz.

19. The radar device of claim 10, wherein the computing unit is a digital signal processor.

20. The radar device of claim 10, further comprising:
a base band signal processing chain configured to filter and amplify the base band signal and provide the base band signal to the analog-to-digital converter.

* * * * *